United States Patent
Chen et al.

(10) Patent No.: US 11,943,569 B2
(45) Date of Patent: Mar. 26, 2024

(54) INTERCOM SYSTEMS AND METHODS USING THE SAME

(71) Applicant: ZHEJIANG DAHUA TECHNOLOGY CO., LTD., Zhejiang (CN)

(72) Inventors: Yufeng Chen, Hangzhou (CN); Tongjin Huang, Hangzhou (CN); Yang Shi, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 314 days.

(21) Appl. No.: 17/445,010

(22) Filed: Aug. 13, 2021

(65) Prior Publication Data

US 2021/0377494 A1    Dec. 2, 2021

Related U.S. Application Data

(63) Continuation of application No. PCT/CN2019/099814, filed on Aug. 8, 2019.

(30) Foreign Application Priority Data

Feb. 27, 2019  (CN) .......................... 201910146365.8

(51) Int. Cl.
H04N 7/18      (2006.01)
H04M 7/12      (2006.01)
H04N 5/262     (2006.01)

(52) U.S. Cl.
CPC .......... *H04N 7/186* (2013.01); *H04M 7/1295* (2013.01); *H04N 5/2624* (2013.01)

(58) Field of Classification Search
CPC ........ H04N 7/186; H04N 7/18; H04N 5/2624; H04M 7/1295
See application file for complete search history.

(56) References Cited

U.S. PATENT DOCUMENTS 11,315,394 B1 *  4/2022  Jackson ................. G08B 13/18
2003/0071902 A1  4/2003  Allen et al.
(Continued)

FOREIGN PATENT DOCUMENTS

CN    104243906 A    12/2014
CN    204633920 U    9/2015
(Continued)

OTHER PUBLICATIONS

The Extended European Search Report in European Application No. 19916992.1 dated Feb. 10, 2022, 10 pages.
(Continued)

Primary Examiner — Olisa Anwah
(74) Attorney, Agent, or Firm — METIS IP LLC

(57) ABSTRACT

Intercom systems and methods for image data transmission are provided. The intercom system may include a first intercom including a first image acquisition device, one or more second image acquisition devices, and a second intercom. During an intercom with the second intercom, the first intercom may receive a request for target image data captured by one or more target image acquisition devices of the first image acquisition device and the one or more second image acquisition devices from the second intercom. The one or more target image acquisition devices may include at least one target second image acquisition device of the one or more second image acquisition devices. In response to the request, the first intercom may obtain the target image data from the one or more target image acquisition devices. The first intercom may also send a signal encoding the target image data to the second intercom for display.

19 Claims, 6 Drawing Sheets

(56) References Cited

U.S. PATENT DOCUMENTS

| | | | |
|---|---|---|---|
| 2004/0132489 A1 | 7/2004 | Ryley et al. | |
| 2008/0043107 A1* | 2/2008 | Coogan | G08B 13/19689 |
| | | | 348/E7.087 |
| 2008/0263613 A1* | 10/2008 | Lin | H04N 21/6125 |
| | | | 348/E7.081 |
| 2009/0021583 A1* | 1/2009 | Salgar | H04N 7/181 |
| | | | 348/E7.085 |
| 2009/0259754 A1* | 10/2009 | Wu | H04N 7/181 |
| | | | 709/227 |
| 2009/0312648 A1 | 12/2009 | Zhang et al. | |
| 2013/0141543 A1* | 6/2013 | Choi | H04N 7/181 |
| | | | 348/47 |
| 2014/0218517 A1 | 8/2014 | Kim et al. | |
| 2015/0242693 A1* | 8/2015 | Chiu | H04N 7/181 |
| | | | 348/159 |
| 2015/0373000 A1* | 12/2015 | Park | H04L 67/104 |
| | | | 726/7 |
| 2016/0295163 A1 | 10/2016 | Shiro et al. | |
| 2017/0264890 A1* | 9/2017 | Gorilovsky | G03B 37/04 |
| 2018/0359451 A1* | 12/2018 | Siminoff | H04N 23/90 |
| 2019/0014459 A1* | 1/2019 | Zong | G06K 19/06 |

FOREIGN PATENT DOCUMENTS

| | | |
|---|---|---|
| CN | 205584396 U | 9/2016 |
| CN | 205792996 U | 12/2016 |
| CN | 106303384 A | 1/2017 |
| CN | 106713815 A | 5/2017 |
| CN | 206506609 U | 9/2017 |
| CN | 108076323 A | 5/2018 |
| CN | 207691460 U | 8/2018 |
| CN | 208174855 U | 11/2018 |
| EP | 3023952 A1 | 5/2016 |
| WO | 2012059279 A1 | 5/2012 |
| WO | 2020173050 A1 | 9/2020 |

OTHER PUBLICATIONS

International Search Report in PCT/CN2019/099814 dated Nov. 27, 2019, 4 pages.
Written Opinion in PCT/CN2019/099814 dated Nov. 27, 2019, 5 pages.
First Office Action in Chinese Application No. 201910146365.8 dated Nov. 25, 2019, 17 pages.

* cited by examiner

INTERCOM SYSTEMS AND METHODS USING THE SAME

CROSS-REFERENCE TO RELATED APPLICATIONS

This application is a Continuation of International Application No. PCT/CN2019/099814, filed on Aug. 8, 2019, which claims priority of Chinese Patent Application No. 201910146365.8, filed on Feb. 27, 2019, the entire content of which is incorporated herein by reference.

TECHNICAL FIELD

The present disclosure generally relates to an intercom system, and in particular, to systems and methods for image data transmission in the intercom system.

BACKGROUND

Intercom systems are widely used in various areas for user communication and/or security monitoring. For example, an indoor intercom mounted inside a home may be connected to an outdoor intercom equipped with a camera, so that a user of the indoor intercom may be able to communicate with an outside visitor and view real-time images outside his/her home. In some occasions, one or more additional image acquisition devices (e.g., IP cameras) may be used to capture image data of the outside visitor and/or the outside environment to enable comprehensive monitoring. In operation, the image data captured by the camera of the outdoor intercom and the additional image acquisition device(s) may need to be transmitted to the indoor intercom for display. Therefore, it is desirable to provide effective intercom systems, as well as methods for image data transmission in the intercom systems, thereby improving the operation efficiency and safety of the intercom systems.

SUMMARY

According to an aspect of the present disclosure, a first intercom of an intercom system is provided. The intercom system may include the first intercom, one or more second image acquisition devices, and a second intercom. The first intercom may include a first image acquisition device that has a first field of view (FOV). Each second image acquisition device may be operably connected to the first intercom and have a second FOV different from the first FOV. The second intercom may be operably connected to the first intercom. During an intercom with the second intercom, the first intercom may be configured to receive a request for target image data captured by one or more target image acquisition devices of the first image acquisition device and the one or more second image acquisition devices from the second intercom. The one or more target image acquisition devices may include at least one target second image acquisition device of the one or more second image acquisition devices. In response to the request, the first intercom may be configured to obtain the target image data from the one or more target image acquisition devices. The first intercom may also be configured to send a signal encoding the target image data to the second intercom for display.

In some embodiments, the signal may be a single-channel signal.

In some embodiments, to receive a request for target image data captured by one or more target image acquisition devices, the first intercom may further be configured to transmit a signal encoding image data captured by one or more initial image acquisition devices of the first image acquisition device and the one or more second image acquisition devices to the second intercom for display. The first intercom may also be configured to receive the request for the target image data captured by the one or more target image acquisition devices from the second intercom. At least one of the one or more target image acquisition devices may be different from each initial image acquisition device.

In some embodiments, to obtain the target image data from the one or more target image acquisition devices in response to the request, the first intercom may be configured to decode the request to obtain an identification for each target image acquisition device. The first intercom may also be configured to identify each target image acquisition device based on its corresponding identification, and obtain the target image data from each identified target image acquisition device.

In some embodiments, the at least one target second image acquisition device may include a plurality of target second image acquisition devices. To send a signal encoding the target image data to the second intercom, the first intercom may be configured to decode the target image data obtained from the one or more target second image acquisition devices, and generate the signal by recoding the decoded target image data.

In some embodiments, the one or more target image acquisition devices may include a plurality of target image acquisition devices. The second intercom may be configured to decode the received signal to obtain the target image data of each target image acquisition device. The second intercom may also be configured to jointly display the target image data of each target image acquisition device.

In some embodiments, the one or more second image acquisition devices may include a plurality of second image acquisition devices. To obtain the target image data from the one or more target second image acquisition devices, the first intercom may be configured to obtain image data from each of the plurality of second image acquisition devices. The first intercom may also be configured to determine, from the image data, the target image data captured by the one or more target second image acquisition devices.

In some embodiments, the request may be encoded by a Dual Tone Multi-Frequency (DTMF) signal.

In some embodiments, the intercom with the second intercom may include at least one of an audio intercom or a video intercom.

In some embodiments, before the intercom with the second intercom, the first intercom may be configured to send a connection request to the second intercom. Upon receiving an approval regarding the connection request from the second intercom, the first intercom may also be configured to establish a connection to the second intercom.

In some embodiments, before the intercom with the second intercom, the first intercom may be configured to receive a connection request from the second intercom. The first intercom may also be configured to send an approval regarding the connection request to the second intercom.

In some embodiments, before the intercom with the second intercom, the first intercom may be configured to receive authentication information of each of the one or more second image acquisition devices. The first intercom may also be configured to establish an operable connection to each of the one or more second image acquisition device based on the authentication information.

According to another aspect of the present disclosure, a second intercom of an intercom system is provided. The intercom system may include a first intercom, one or more second image acquisition devices, and the second intercom operably connected to the first intercom. The first intercom may include a first image acquisition device that has a first FOV. Each second image acquisition device may be operably connected to the first intercom and have a second FOV different from the first FOV. During an intercom with the first intercom, the second intercom may be configured to send a request for target image data captured by at least two target image acquisition devices of the first image acquisition device and the one or more second image acquisition devices to the first intercom. The at least two target image acquisition devices may include at least one target second image acquisition device of the one or more second image acquisition devices. The second intercom may also be configured to receive a single-channel signal encoding the target image data from the first intercom. The second intercom may also be configured to jointly display the target image data of the at least two target image acquisition devices.

In some embodiments, to send a request for target image data captured by at least two target image acquisition devices, the second intercom may further be configured to receive a signal encoding image data captured by one or more initial image acquisition devices of the first image acquisition device and the one or more second image acquisition devices from the first intercom. The second intercom may also be configured to transmit the request for the target image data captured by the at least two target image acquisition devices to the first intercom. At least one of the at least two target image acquisition devices may be different from each initial image acquisition device.

In some embodiments, to jointly display the target image data of the at least two target image acquisition devices, the second intercom may be configured to decode the received single-channel signal to obtain the target image data of the at least two target image acquisition devices. The second intercom may also be configured to jointly display the target image data of the at least two target image acquisition devices.

In some embodiments, the request may be encoded by a DTMF signal.

In some embodiments, the intercom with the first intercom may include at least one of an audio intercom or a video intercom.

In some embodiments, before the intercom with the first intercom, the second intercom may be configured to send a connection request to the first intercom. Upon receiving an approval regarding the connection request from the first intercom, the second intercom may also be configured to establish a connection to the first intercom.

In some embodiments, before the intercom with the first intercom, the second intercom may be configured to receive a connection request from the first intercom. The second intercom may also be configured to send an approval regarding the connection request to the first intercom.

According to still another aspect of the present disclosure, a method implemented by a first intercom of an intercom system is provided. The intercom system may include the first intercom , one or more second image acquisition devices, and a second intercom. The first intercom may include a first image acquisition device that has a first field of view (FOV). Each second image acquisition device may be operably connected to the first intercom and having a second FOV different from the first FOV. The second intercom may be operably connected to the first intercom. During an intercom between the first intercom and the second intercom, the method may include receiving a request for target image data captured by one or more target image acquisition devices of a first image acquisition device and one or more second image acquisition devices from the second intercom. The one or more target image acquisition devices may include at least one target second image acquisition device of the one or more second image acquisition devices. In response to the request, the method may include obtaining the target image data from the one or more target image acquisition devices. The method may also include sending a signal encoding the target image data to the second intercom for display.

According to still another aspect of the present disclosure, a method implemented by a second intercom of an intercom system is provided. The intercom system may include a first intercom, one or more second image acquisition devices, and the second intercom operably connected to the first intercom. The first intercom may include a first image acquisition device that has a first field of view (FOV). Each second image acquisition device may be operably connected to the first intercom and having a second FOV different from the first FOV. During an intercom between the first intercom and the second intercom, the method may include sending a request for target image data captured by at least two target image acquisition devices of the first image acquisition device and the one or more second image acquisition devices to the first intercom. The at least two target image acquisition devices may include at least one target second image acquisition device of the one or more second image acquisition devices. The method may also include receiving a single-channel signal encoding the target image data from the first intercom. The method may also include jointly displaying the target image data of the at least two target image acquisition devices.

According to still another aspect of the present disclosure, a non-transitory computer readable medium is provided. The non-transitory computer readable medium may include at least one set of instructions for image data transmission in an intercom system. The intercom system may include a first intercom, one or more second image acquisition devices, and a second intercom. The first intercom may include a first image acquisition device that has a first field of view (FOV). Each second image acquisition device may be operably connected to the first intercom and having a second FOV different from the first FOV. The second intercom may be operably connected to the first intercom. When executed by one or more processors of the first intercom, the at least one set of instructions may cause the first intercom to perform a method during an intercom between the first intercom and the second intercom. The method may include receiving a request for target image data captured by one or more target image acquisition devices of a first image acquisition device and one or more second image acquisition devices from the second intercom. The one or more target image acquisition devices may include at least one target second image acquisition device of the one or more second image acquisition devices. In response to the request, the method may include obtaining the target image data from the one or more target image acquisition devices. The method may also include sending a signal encoding the target image data to the second intercom for display.

According to still another aspect of the present disclosure, a non-transitory computer readable medium is provided. The non-transitory computer readable medium may include at least one set of instructions for image data transmission in an intercom system. The intercom system may include a first intercom, one or more second image acquisition devices, and the second intercom operably connected to the first intercom. The first intercom may include a first image acquisition device that has a first field of view (FOV). Each second image acquisition device may be operably connected to the first intercom and having a second FOV different from the first FOV. When executed by one or more processors of the second intercom, the at least one set of instructions may cause the second intercom to perform a method during an intercom between the first intercom and the second intercom. The method may include sending a request for target image data captured by at least two target image acquisition devices of the first image acquisition device and the one or more second image acquisition devices to the first intercom. The at least two target image acquisition devices may include at least one target second image acquisition device of the one or more second image acquisition devices. The method may also include receiving a single-channel signal encoding the target image data from the first intercom. The method may also include jointly displaying the target image data of the at least two target image acquisition devices.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression(s) if they may achieve the same purpose.

Figure 1:
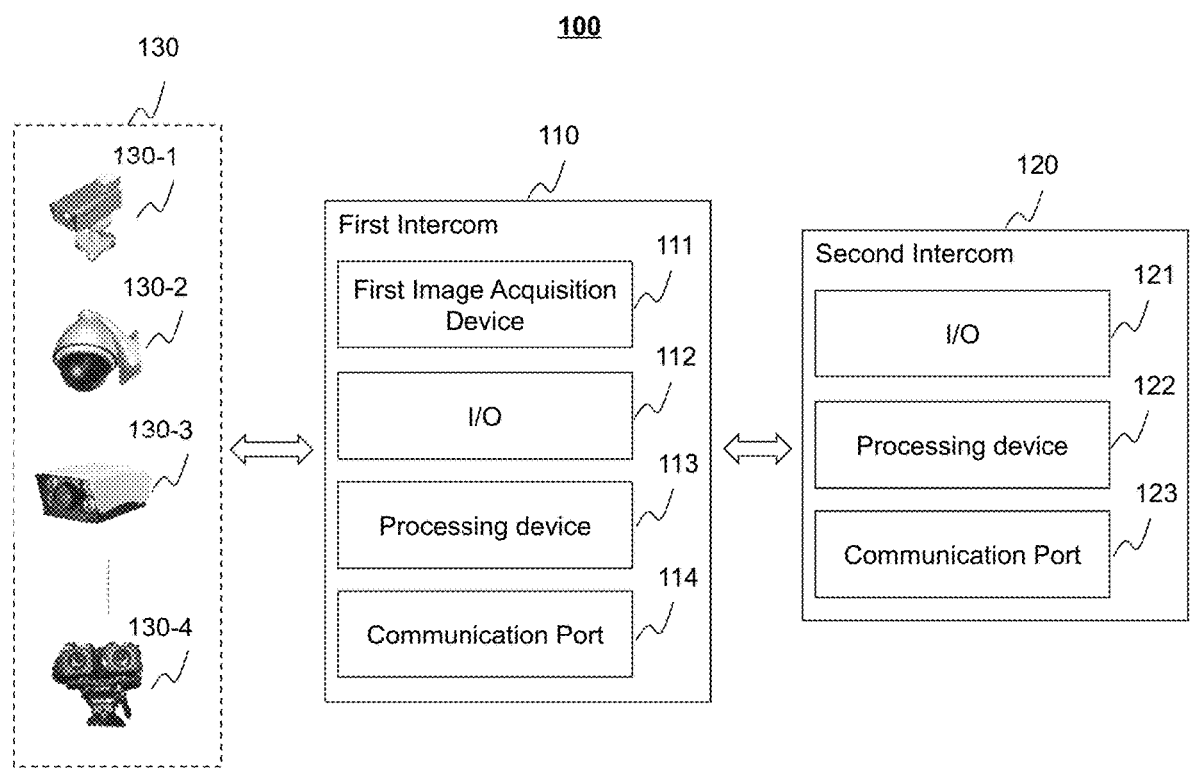
FIG. 1 is a schematic diagram of an exemplary intercom system according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device(s). In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processing device 113 and/or processing device 122 as illustrated in FIG. 1) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to an intercom system and methods using the same. The intercom system may include a first intercom including a first image acquisition device that has a first field of view (FOV), a second intercom operably connected to the first intercom, and one or more second image acquisition devices. Each second image acquisition device may be operably connected to the first intercom and have a second FOV different from the first FOV. During a video and/or audio intercom between the first intercom and the second intercom, the first intercom may receive a request for target image data captured by one or more target image acquisition devices from the second intercom. The target image acquisition device(s) may include at least one target second image acquisition device of the second image acquisition device(s) and optionally the first image acquisition device. The first intercom may obtain the target data from the target image acquisition device(s), and process the target image data to generate a signal encoding the target image data. The first intercom may further send the signal to the second intercom for display. For example, the target image data may include image data captured by a plurality of second image acquisition devices and be jointly displayed on the second intercom.

According to some embodiments of the present disclosure, the first intercom may serve as an intermediary device for image data processing and transmission between the second intercom and the second image acquisition device(s). For example, the second intercom may obtain and display image data captured by a second image acquisition device via the first intercom without connecting to the second image acquisition device directly. In this way, the second intercom may not need to store authentication information (e.g., an IP address, a user name, and/or a password) of the second image acquisition device, which may avoid the leak of the authentication information and improve the information safety of the intercom system. In addition, in some embodiments, the first intercom may be operably connected to a plurality of second intercoms. Using the first intercom as a centralized image data processing and transmission device may obviate the need of establishing a connection between each second intercom and each second image acquisition device. For example, there is no need to input authentication information of each second image acquisition device into each second intercom or installing a wire to connect each second image acquisition device with each second intercom. In this way, the complexity and cost of the intercom system may be reduced by, e.g., reducing the cost of wiring and installation.

FIG. 1 illustrates a schematic diagram of an exemplary intercom system 100 according to some embodiments of the present disclosure. The intercom system 100 may allow a group of people located at different locations to communicate with each other. The intercom system 100 may be used as, for example, a communication system, a security system, a surveillance system, or the like, and be applied in various scenarios, such as a residential building, an office building, a shopping mall, a hospital, etc. For illustration purposes, the present disclosure is described with reference to an intercom system 100 applied in a residential building. This not intended to limit the scope of the present disclosure, and the intercom system 100 may be applied in any other scenarios (e.g., an office building, a collection of buildings in a residential community or a business center).

As shown in FIG. 1, the intercom system 100 may include a first intercom 110, a second intercom 120, and one or more second image acquisition devices 130. The first intercom 110 and the second intercom 120 may be located at two different positions in the residential building and operably connected to each other. A user of the first intercom 110 and a user of the second intercom 120 may communicate, for example, have an audio intercom and/or a video intercom, with each other via the first intercom 110 and the second intercom 120. For example, the first intercom 110 may be an outdoor intercom positioned at an entrance of the residential building or outside a house gate of a particular resident in the residential building. The second intercom 120 may be an indoor intercom positioned inside a house of the particular resident in the residential building. In such cases, the particular resident may use the second intercom 120 to communicate with a visitor outside the house gate or at the entrance of the residential building.

Each second image acquisition device 130 may be configured to capture image data relating to the residential building. For example, a second image acquisition device 130 may be mounted outside the residential building (e.g., near an entrance of the residential building) to capture images of the outside environment of the residential building. As another example, a second image acquisition device 130 may be mounted at the house gate of a particular resident in the residential building to capture images of, e.g., a visitor to the particular resident.

As illustrated in FIG. 1, the second image acquisition device(s) 130 may be operably connected to the first intercom 110. In some embodiments, the intercom system 100 may include a plurality of second image acquisition devices 130, all or a portion of which may be operably connected to the first intercom 110. In some embodiments, in order to establish an operable connection between the first intercom 110 and a second image acquisition device 130, a user (e.g., an administrator or a security guard of the residential building) may input authentication information of the second image acquisition device 130 into the first intercom 110 via an interface (e.g., a web interface) of the first intercom 110. The authentication information may include, for example, an IP address, a user name, and/or a password of the second image acquisition device 130. The first intercom 110 may establish an operable connection to the second image acquisition device 130 if the authentication information is valid. Optionally, the first intercom 110 may store the authentication information into a storage of the first intercom 110.

In some embodiments, the first intercom 110 may serve as an intermediary device between the second intercom 120 and the second image acquisition device(s) 130. The image data captured by all or a portion of the second image acquisition device(s) may be transmitted to the first intercom 110. The first intercom 110 may process the image data and transmit a signal encoding the image data to the second intercom 120 for display. Merely by way of example, the first intercom 110 may be mounted at the entrance of the residential building and the second intercom 120 may be mounted at the home of a particular resident. A visitor of the particular resident may use the first intercom 110 to initiate an intercom with the particular resident. The first intercom 110 may include a camera that can capture image data of the visitor standing in front of the first intercom 110. The second image acquisition device(s) 130 may be mounted near the entrance of the residential building to capture image data of the visitor from different perspective(s). During the intercom, the second intercom 120 may display image data of the visitor captured by the first intercom 110 to the particular resident. If the particular resident wants to view target image data captured by a certain second image acquisition device 130, he/she may input a request for the target image data via the second intercom 120. The second intercom 120 may send the request to the first intercom 110. In response to the request, the first intercom 110 may obtain the target image data from the certain second image acquisition device 130 and process the target image data to generate a signal encoding the target image data. The signal may be transmitted to the second intercom 120, and the second intercom 120 may display the target image data to the particular resident.

In some embodiments, the residential building may include a plurality of resident families. Each resident family may be configured with an individual intercom system 100 including, for example, an individual first intercom 110 and one or more second image acquisition devices 130 mounted at the house gate, and a second intercom 120 mounted at home. Alternatively, the intercom systems 100 of different resident families may share one or more devices. For example, one or more centralized first intercoms 110 may be mounted at, for example, an entrance or a stairway of the residential building and operably connected to the second intercoms 120 of all or a portion of the resident families. As another example, one or more centralized second image acquisition devices 130 may be mounted, for example, near an entrance or a stairway of the residential building and operably connected to the first intercoms 110 of all or a portion of the resident families.

In some embodiments, as illustrated in FIG. 1, a first intercom 110 may include a first image acquisition device 111, an input/output (I/O) 112, a processing device 113, and a communication port 114. The first image acquisition device 111 may be configured to capture image data with a first FOV. For example, the first image acquisition device 111 may capture image data of a user (e.g., a security guard of the residential building or a visitor) in front of the first intercom 110. In some embodiments, the first FOV may be a fixed FOV or a variable FOV. The first image acquisition device 111 may be and/or include any suitable device that is capable of acquiring image data. Exemplary first image acquisition devices 111 may include a camera (e.g., a digital camera, an analog camera, an IP camera (IPC), etc.), a video recorder, a scanner, a built-in camera of a terminal device (e.g., a mobile phone, a tablet computing device, or a wearable computing device), an infrared imaging device (e.g., a thermal imaging device), or the like. In some embodiments, the first image acquisition device 111 may include a gun camera, a dome camera, an integrated camera, a binocular camera, a monocular camera, etc.

The image data acquired by the first image acquisition device 111 may include an image and/or data about the image, such as values of one or more pixels of the image (e.g., luma, gray values, intensities, chrominance, contrast of one or more pixels of an image), RGB data, audio information, timing information, location data, etc. In some embodiments, the first image acquisition device 111 may include a charge-coupled device (CCD), a complementary metal-oxide-semiconductor (CMOS) sensor, an N-type metal-oxide-semiconductor (NMOS), a contact image sensor (CIS), and/or any other suitable image sensor.

The I/O 112 may enable user interaction with the first intercom 110. For example, the I/O 112 may receive a request (e.g., a request for connecting the second intercom 120) and/or data (e.g., authentication information of a second image acquisition module 130) from a user of the first intercom 110. As another example, the I/O 112 may output audio and/or video data received from the second intercom 120 to a user of the first intercom 110. In some embodiments, the I/O 112 may include an input component and/or an output component. Exemplary input components may include a keyboard, a mouse, a touch screen, a microphone, or the like, or a combination thereof. Exemplary output components may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), a touch screen, or the like, or a combination thereof.

The processing device 113 may process information and/or data relating to the first intercom 110 to perform one or more functions of the first intercom 110 described in the present disclosure. For example, the processing device 113 may receive a user request from the second intercom 120 and process information and/or data to satisfy the user request. In some embodiments, the processing device 113 may include one or more processing devices (e.g., single-core processing device(s) or multi-core processor(s)). Merely by way of example, the processing device 113 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

Merely for illustration, only one processing device may be described in the first intercom 110. However, it should be noted that the first intercom 110 of the present disclosure may also include multiple processing devices, and thus operations and/or method steps that are performed by one processing device as described in the present disclosure may also be jointly or separately performed by the multiple processing devices. For example, if in the present disclosure the processing device of the first intercom 110 executes both operations A and operation B, it should be understood that operation A and operation B may also be performed by two or more different processing devices jointly or separately in the first intercom 110 (e.g., a first processing device executes operation A and a second processing device executes operation B, or vice versa, or the first and second processing devices jointly execute operations A and B).

The communication port 114 may facilitate data communications between the first intercom 110 and one or more other components of the intercom system 100. For example, the communication port 114 may establish a connection between the first intercom 110 and the second intercom 120. As another example, the communication port 114 may establish a connection between the first intercom 110 and one or more of the second image acquisition device(s) 130.

As used herein, a connection between two connected components may include a wired connection, a wireless connection, or any other communication connection that can enable data transmission and/or reception, or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 114 may be and/or include a standardized communication port, such as RS232, RS485, etc. In some embodiments, the communication port 114 may be a specially designed communication port. For example, the communication port 114 may be designed in accordance with analog signal transmission.

In some embodiments, the communication port 114 may be connected to a network (not shown in FIG. 1) to felicitate data communications. In some embodiments, the network may be any type of wired or wireless network, or combination thereof. Merely by way of example, the network may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

In some embodiments, the first intercom 110 may be configured as a terminal including, for example, a tablet computer, a laptop computer, a mobile phone, a personal digital assistant (PDA), a smartwatch, a point of sale (POS) device, a virtual reality (VR), an augmented reality (AR), an onboard computer, an onboard television, a wearable device, or the like, or any combination thereof. For example, the first intercom 110 may be implemented by a terminal device 800 having one or more components as described in connection with FIG. 8. In some embodiments, the first intercom 110 may be fixed at a certain location in the residential building or be a mobile device that can be carried by a user.

In some embodiments, as illustrated in FIG. 1, a second intercom 120 may include an input/output (I/O) 121, a processing device 122, and a communication port 123. The I/O 121 may enable user interaction with the second intercom 120. For example, the I/O 121 may receive a request (e.g., a request for connecting the first intercom 110) from a user of the second intercom 120. In some embodiments, the I/O 121 may include an input component (e.g., a keyboard, a touch screen, and/or a microphone) and/or an output component (e.g., a display). Exemplary input components and/or output components may be found elsewhere in this disclosure.

The processing device 122 may process information and/or data relating to the second intercom 120 to perform one or more functions of the second intercom 120 described in the present disclosure. For example, the processing device 122 may receive a user request inputted via the I/O 121 and send the user request to the first intercom 110. As another example, the processing device 122 may decode information and/or a signal received from the first intercom 110. In some embodiments, the processing device 122 may be implemented on a same or similar type of device as the processing device 113 as described above.

The communication port 123 may facilitate data communications between the second intercom 120 and one or more other components of the intercom system 100. For example, the communication port 123 may establish a connection (e.g., a wired connection and/or a wireless connection) between the second intercom 120 and the first intercom 110. The communication port 123 may be implemented on a same or similar type of device as the communication port 114 as described above.

In some embodiments, similar to the first intercom 110, the second intercom 120 may be configured as a terminal device, such as the terminal device 800. The second intercom 120 may be fixed at a certain location in the residential building or be a mobile device.

In some embodiments, each second image acquisition device 130 may have a second FOV (e.g., a FOV covering the surroundings of a user of the first intercom 110) different from the first FOV. A second image acquisition device 130 may be and/or include any suitable device that is capable of acquiring image data as aforementioned. For example, as illustrated in FIG. 1, the second image acquisition device(s) 130 may include a gun camera 130-1, a dome camera 130-2, an integrated camera 130-3, a binocular camera 130-4, a monocular camera, etc. In some embodiments, a second image acquisition device 130 may have a fixed FOV or a variable FOV.

It should be noted that the above description regarding the intercom system 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more components of the intercom system 100 may be integrated into one component, or one component of the intercom system 100 may be divided into multiple components. For example, the communication port 123 may be integrated into the processing device 122. Additionally or alternatively, one or more components of the intercom system 100 may be omitted or replaced by other component(s) that can realize the same or similar functions. For example, the first image acquisition device 111 of the first intercom 110 may be omitted.

In some embodiments, the intercom system 100 may include one or more additional components. For example, the second intercom 120 may include a third image acquisition device, e.g., facing a user of the second intercom 120. The image data captured by the third image acquisition device may be transmitted from the second intercom 120 to the first intercom 110 for display. As another example, the intercom system 100 may include a storage device, such as an independent storage device or a storage device integrated into one or more components of the intercom system 100. Merely by way of example, the first intercom 110 may include a storage device configured to store data and/or instructions, such as authentication information of a second image acquisition device 130, data and/or instructions for the processing device 113 to execute. In some embodiments, the storage device may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

Figure 2:
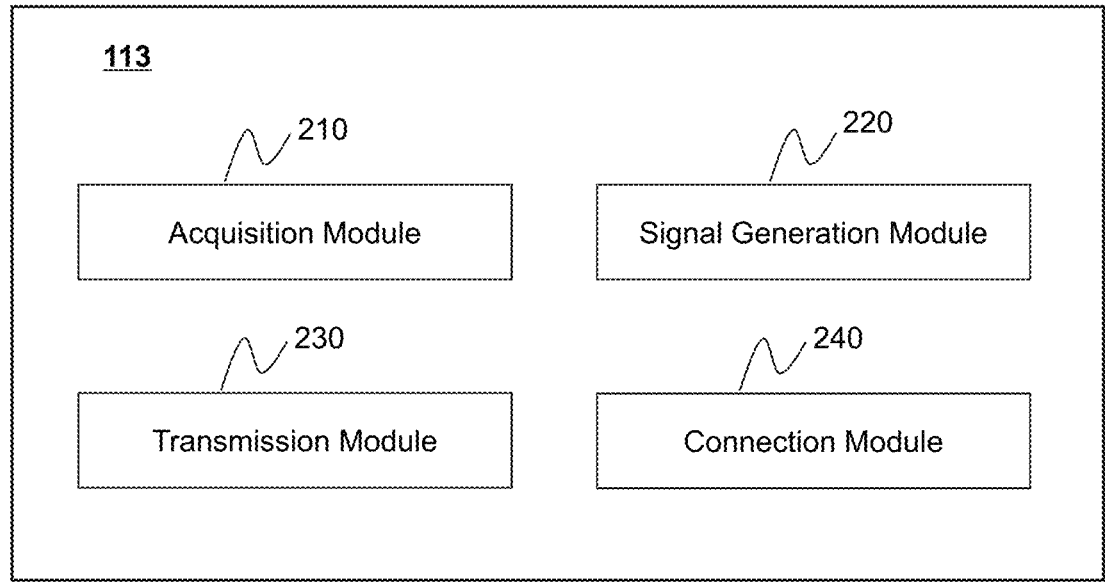
FIG. 2 is a schematic diagram illustrating an exemplary processing device of a first intercom according to some embodiments of the present disclosure.

FIG. 2 is a schematic diagram illustrating an exemplary processing device 113 of a first intercom according to some embodiments of the present disclosure. As shown in FIG. 2, the processing device 113 may include an acquisition module 210, a signal generation module 220, a transmission module 230, and a connection module 240.

The acquisition module 210 may be configured to obtain and/or receive information, requests, and/or instructions from one or more components of the intercom system 100. For example, the acquisition module 210 may receive a request from a second intercom 120. The request may be a request for target image data captured by one or more target image acquisition devices or a connection request sent by the second intercom 120. As another example, the acquisition module 210 may obtain the target image data from the target image acquisition device(s) in response to the request for the target image data. More descriptions regarding the request for the target image data and the obtaining of the target image data may be found elsewhere in the present disclosure. See, e.g., operations 420 and 430 in FIG. 4 and relevant descriptions thereof.

Figure 3:
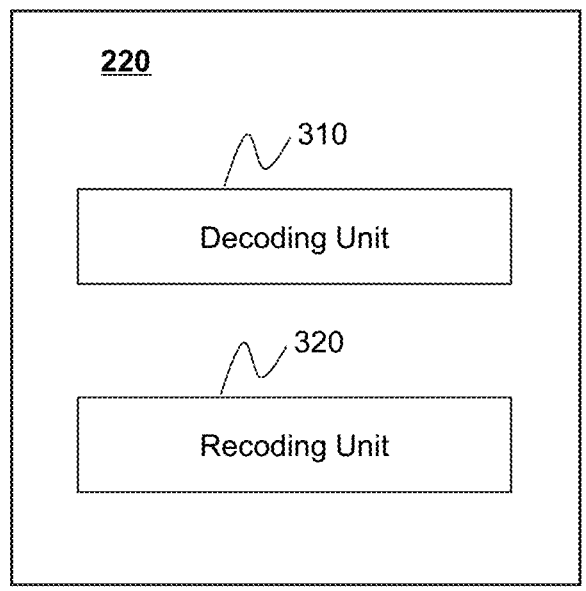
FIG. 3 is a schematic diagram illustrating an exemplary signal generation module according to some embodiments of the present disclosure.

The signal generation module 220 may be configured to generate a signal encoding the target image data. In some embodiments, the signal encoding the target image data may be a single-channel signal. In some embodiments, the signal generation module 220 may include one or more units as shown in FIG. 3. More descriptions of the generation of the signal encoding the target image data may be found elsewhere in the present disclosure (e.g., operation 440 and the descriptions thereof).

The transmission module 230 may be configured to transmit information, instructions, and/or requests to one or more other components of the intercom system 100. For example, the transmission module 230 may send a connection request to a second intercom 120. As another example, the transmission module 230 may send an approval regarding a connection request to the second intercom 120. As still another example, the transmission module 230 may send a signal encoding target image data to the second intercom 120 in response to a request for the target image data received from the second intercom 120.

The connection module 240 may be configured to establish a connection and/or an intercom between the first intercom and one or more other components of the intercom system 100, such as a second intercom 120 and/or a second image acquisition device 130. More descriptions regarding the connection establishment and/or the intercom establishment may be found elsewhere in the present disclosure. See, e.g., operations 410 and 430 in FIG. 4 and relevant descriptions thereof.

FIG. 3 is a schematic diagram illustrating an exemplary signal generation module 220 according to some embodiments of the present disclosure. As shown in FIG. 3, the signal generation module 220 may include a decoding unit 310 and a recoding unit 320. The decoding unit 310 may be configured to decode target image data obtained from one or more target image acquisition devices. In some embodiments, the decoding may be performed based on any image data decoding techniques. The recoding unit 320 may be configured to recode the decoded target image data to generate a signal encoding the target image data. Optionally, the recoding of the decoded target image data may include compressing the decoded target image data. In some embodiments, the recoding may be performed based on any image data compression and/or recoding techniques.

It should be noted that the above descriptions of the processing device 113 and the signal generation module 220 are merely provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. In some embodiments, two or more of the modules (or units) may be combined into a single module (or unit), and any one of the modules may be divided into two or more units. For example, the transmission module 230 and the connection module 240 may be integrated into a single module. As another example, the connection module 240 may include a first unit to establish a connection between the first intercom and a second intercom 120, and a second unit to establish a connection between the first intercom and a second image acquisition device 130. In some embodiments, one or more of the modules mentioned above may be omitted and/or one or more additional modules may be added in the processing device 113. For example, the processing device 113 may further include a storage module.

Figure 4:
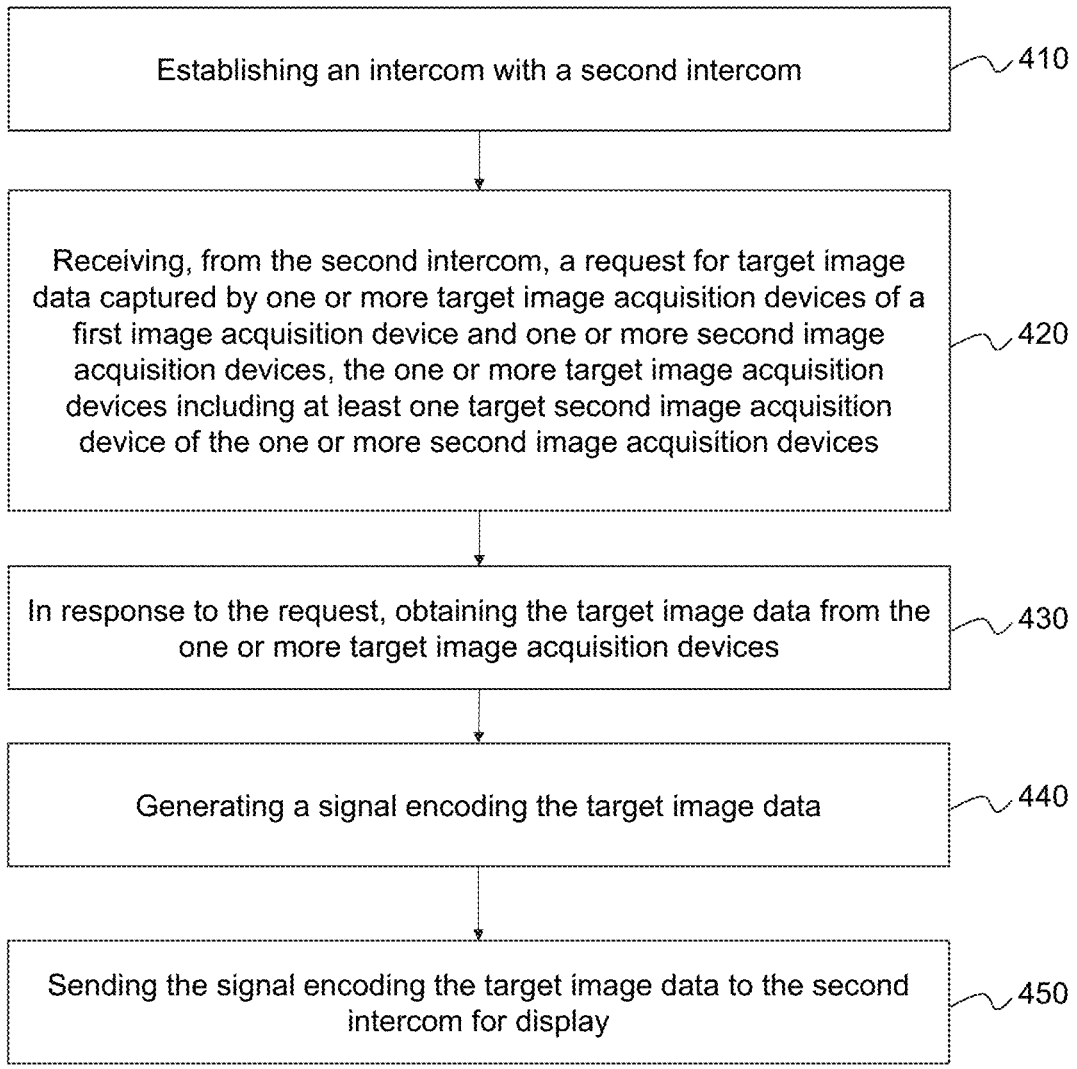
FIG. 4 is a flowchart of an exemplary process for data transmission in an intercom system according to some embodiments of the present disclosure.

FIG. 4 is a flowchart of an exemplary process for data transmission in an intercom system according to some embodiments of the present disclosure. In some embodiments, one or more operations in the process 400 may be implemented in the intercom system 100 illustrated in FIG. 1. For example, one or more operations in the process 400 may be stored in a storage device (e.g., a storage device of a first intercom 110) as a form of instructions, and invoked and/or executed by a processing device 113 (e.g., one or more modules illustrated FIGS. 2 and 3) of the first intercom 110. The first intercom 110 may be operably connected to a second intercom 120 and one or more second image acquisition devices 130. The first intercom 110 may include a first image acquisition device 111 that has a first FOV. Each second image acquisition device 130 may have a second FOV different from the first FOV. Merely by way of example, the first intercom 110 may be an outdoor intercom mounted at an entrance of a residential building, and the second intercom 120 may be an indoor intercom mounted inside a house of a particular resident of the residential building.

In 410, the first intercom 110 (e.g., the processing device 113, the connection module 240) may establish an intercom with the second intercom 120.

In some embodiments, before the intercom between the first intercom 110 and the second intercom 120 starts, a connection between the first intercom 110 and the second intercom 120 may need to be established. The connection may be initiated by a user of the first intercom 110. For example, the user of the first intercom 110 may input or select the second intercom 120 which he/she wants to call via the I/O 112 (e.g., a keyboard or a touch screen) of the first intercom 110. In response to the user input or selection, the first intercom 110 may send a connection request (or also referred as an intercom request herein) to the second intercom 120. After the first intercom 110 receives an approval (e.g., a response) regarding the connection from the second intercom 120, the connection between the first intercom 110 and the second intercom 120 may be established. In some embodiments, the intercom between the first intercom 110 and the second intercom 120 may be automatically established after the connection is established. Alternatively, the intercom between the first intercom 110 and the second intercom 120 may be established after the user of the second intercom 120 approves the intercom.

Alternatively, the connection may be initiated by the second intercom 120. For example, the user of the second intercom 120 may input or select the first intercom 110 which he/she wants to call via the I/O 121 (e.g., a keyboard or a touch screen) of the second intercom 120. In response to the user input or selection, the second intercom 120 may send a connection request to the first intercom 110. After the second intercom 120 receives an approval (e.g., a response) regarding the intercom from the first intercom 110, the connection between the first intercom 110 and the second intercom 120 may be established. In some embodiments, the intercom between the first intercom 110 and the second intercom 120 may be automatically established after the connection is established. Alternatively, the intercom between the first intercom 110 and the second intercom 120 may be established after the user of the first intercom 110 approves the intercom.

In some embodiments, the intercom may include an audio intercom, a video intercom, or the like, or any combination thereof. For example, each of the first intercom 110 and the second intercom 120 may include a microphone, which enables an audio intercom between the user of the first intercom 110 and the user of the second intercom 120. Optionally, after the intercom is established, the first intercom 110 may transmit a signal encoding image data captured by one or more initial image acquisition devices of the first image acquisition device 111 and the second image acquisition device(s) 130 to the second intercom 120 for display. The initial image acquisition device(s) may be determined according to a default setting of the intercom system 100 (e.g., the first intercom 110 or the second intercom 120) or be set by a user of the intercom system 100 (e.g., the first intercom 110 or second intercom 120). For example, according to a default setting of the first intercom 110, a signal encoding image data captured by the first image acquisition device 111 and optionally a certain second image acquisition device 130 may be transmitted to the second intercom 120 immediately after the intercom is established.

In some embodiments, the second intercom 120 may include a third image acquisition device. If the third image acquisition device is turned on (e.g., by the user of the second intercom 120 or according to a default setting of the second intercom 120), image data captured by the third image acquisition device may be transmitted to the first intercom 110 for display and a two-way video intercom may be established between the first intercom 110 and the second intercom 120. If the third image acquisition device is turned off (e.g., by the user of the second intercom 120 or according to a default setting of the second intercom 120), a one-way video intercom or an audio intercom may be established between the first intercom 110 and the second intercom 120.

In 420, during the intercom with the second intercom 120, the first intercom 110 (e.g., the processing device 113, the acquisition module 210) may receive a request for target image data captured by one or more target image acquisition devices.

As used herein, the target image acquisition device(s) may include any image acquisition device selected from the first image acquisition device 111 and the second image acquisition device(s) 130 by the user of the second intercom 120 who inputs the request for the target image data. In some embodiments, the target image acquisition device(s) may include at least one target second image acquisition device of the second image acquisition device(s) 130. The target image data of a target image acquisition device may refer to image data (e.g., one or more images and/or a video) captured by the target image acquisition device.

For example, during an audio intercom, the user of the second intercom 120 may send a request for target image data captured by the first image acquisition device 111 and/or one or more of the second image acquisition device(s) 130 to the first intercom 110 via the second intercom 120. As another example, as described in connection with 410, the second intercom 120 may display image data captured by one or more initial image acquisition devices after the intercom is established. The user of the second intercom 120 may input the request to view the target image data captured by the target image acquisition device(s), wherein at least one of the target image acquisition device(s) may be different from each initial acquisition device. Merely by way of example, the second intercom 120 may display image data captured by the first image acquisition device 111 after the intercom is established. In order to view image data captured from another perspective, the user of the second intercom 120 may send a request for target image data captured by a target second image acquisition device 130 to the first intercom 110.

In some embodiments, the request received by the first intercom 110 may include an identification of each target image acquisition device. An identification of a target image acquisition device may be used to uniquely identify the target image acquisition device from the first image acquisition device 111 and the second image acquisition device(s) 130. For example, an identification of a target image acquisition device may include a channel number (e.g., 001, 010, or 011), a MAC address, a name, or the like, or any combination thereof, of the target image acquisition device. The identification of a target image acquisition device may be a defaulting setting of the intercom system 100 or be set by a user of the intercom system 100 (e.g., the first intercom 110 or the second intercom 120).

In some embodiments, the user (e.g., a particular resident) of the second intercom 120 may input the request via the I/O 121 of the second intercom 120. For example, the user of the second intercom 120 may press one or more keys (e.g., physical buttons, virtual buttons displayed on a touch screen) of the second intercom 120 to input the request. Each key may correspond to a target image acquisition device, for example, keys 1, 2, and 3 may correspond to target image acquisition devices with identifications 001, 010, and 011, respectively. The second intercom 120 may store a first corresponding relationship between keys and identifications of the image acquisition devices in the intercom system 100. Based on the first corresponding relationship, the second intercom 120 may determine the identification of each target image acquisition device. Further, the second intercom 120 may transmit a signal encoding the request (which includes the determined identification of each target image acquisition device) to the first intercom 110. Alternatively, the first intercom 110 may store a second corresponding relationship between signals triggered by the keys of the second intercom 120 and identifications of the image acquisition devices in the intercom system 100. The first intercom 110 may receive a signal encoding the request from the second intercom 120. Based on the second corresponding relationship and the signal, the first intercom 110 may determine the identification of each target image acquisition device. Exemplary signals encoding the request may include a Dual Tone Multi-Frequency (DTMF) signal.

In 430, in response to the request, the first intercom 110 (e.g., the processing device 113, the acquisition module 210) may obtain the target image data from the target image acquisition device(s).

In some embodiments, the first intercom 110 may decode the request (e.g., a signal encoding the request) to obtain the identification of each target image acquisition device. The first intercom 110 may further identify each target image acquisition device based on its corresponding identification. For example, if the decoded request shows that the target image acquisition device(s) include the first image acquisition device 111, the first intercom 110 may obtain image data from the first image acquisition device 111 as the target image data (or a portion thereof).

As another example, the target image acquisition device (s) may include a certain target second image acquisition device 130. The first intercom 110 may store a corresponding relationship between an IP address of each second image acquisition device in the intercom system 100 and its corresponding identification. The first intercom 110 may determine the IP address of the certain target second image acquisition device 130 based on its identification decoded from the request. The first intercom 110 may further retrieve image data of the certain target second image acquisition device 130 as the target image data (or a portion thereof) from the determined IP address. In some embodiments, the operable connection between the first intercom 110 and the certain target second image acquisition device 130 may be established in advance (e.g., when the intercom system 100 is mounted). The first intercom 110 may directly obtain image data from the IP address of the certain target second image acquisition device 130. Alternatively, before obtaining image data from the certain target second image acquisition device 130, the first intercom 110 may need to obtain authentication information (e.g., a login name and/or a password) of the certain target second image acquisition device 130 from, e.g. a storage of the first intercom 110. The first intercom 110 may establish an operable connection to the certain target second image acquisition device 130 according to its authentication information.

In some embodiments, the image data obtained from a target image acquisition device may include real-time image data captured by the target image data and/or historical image data captured by the target image acquisition device in a certain period (e.g., 0.5 seconds, 1 second, or 2 seconds) before the request is received by the first intercom 110. Optionally, the target image data may be encoded in any signal (e.g., a digital signal, an analog signal, a mixed-signal of digital signal and analog signal) that can encode image data.

In some embodiments, the second image acquisition device(s) 130 may include a plurality of second image acquisition devices 130. In response to the request, the first intercom 110 may obtain a signal encoding image data from each of the second image acquisition device 130 via, e.g., a standard onvif protocol. The signal received from each second image acquisition device 130 may include an identification and/or authentication information of the second image acquisition device 130. The first intercom 110 may identify the signal corresponding to the at least one target second image acquisition device among the signals received from the second image acquisition devices 130, so as to determine the target image data. In some embodiments, in operation, the second image acquisition devices 130 may transmit captured image data to the first intercom 110 in real-time, periodically, or intermittently. After receiving the request, the first intercom 110 may determine the target image data captured by the at least one target second image acquisition device from the image data received from the second image acquisition devices 130.

In 440, the first intercom 110 (e.g., the processing device 113, the signal generation module 220) may generate a signal encoding the target image data.

In some embodiments, the signal encoding the target image data may be a single-channel signal. In some embodiments, the signal may encode target image data and also audio data. For example, the signal may include both the target image data and an audio recorded by a microphone of the first intercom 110. In some embodiments, the target image acquisition device(s) may include a plurality of target image acquisition devices. The first intercom 110 may decode the target image data obtained from the target image acquisition devices, and generate the signal encoding the target image data by recoding the decoded target image data. Optionally, the recoding of the decoded target image data may include compressing the decoded target image data. In some embodiments, the signal generation may be performed based on any image data decoding, compression, and/or recoding techniques.

In 450, the first intercom 110 (e.g., the processing device 113, the transmission module 230) may send the signal encoding the target image data to the second intercom 120 for display.

In some embodiments, the second intercom 120 may decode the signal to obtain the target image data and display the target image data. Optionally, the target image acquisition device(s) may include a plurality of target image acquisition devices. The second intercom 120 may jointly display the target image data captured by the target image acquisition devices. For example, the second intercom 120 may split its screen into a plurality of regions (e.g., 4 regions, 9 regions, or 16 regions). The count of the regions may be equal to the count of the target image acquisition devices, wherein each region may be used to display the target image data captured by one of the target image acquisition devices. Alternatively, the count of the regions may be greater than the count of the target image acquisition devices, wherein a portion of the regions may be used to display the target image data. Merely by way of example, the count of the target image acquisition devices may be equal to 3. The screen of the second intercom 120 may be split into 4 regions, 3 of which may be used to jointly display videos captured by the three target image acquisition devices.

In some embodiments, the user of the second intercom 120 may input a response regarding the target image data displayed by the second intercom 120. For example, the user of the second intercom 120 may select a video captured by a particular target image acquisition device to enlarge the video and/or delete a video captured by a particular target image acquisition device. Alternatively, the user of the second intercom 120 may input a new request for target image data captured one or more other target image acquisition devices.

In some embodiments, during the intercom of between the first intercom 110 and the second intercom 120, one or more of operations 420 to 450 may be performed continuously so that real-time image data captured by the target image acquisition device(s) may be transmitted to the second intercom 120 for display. Alternatively, one or more of operations 420 to 450 may be performed periodically and/or intermittently so that image data captured by the target image acquisition device(s) may be transmitted to the second intercom 120 periodically and/or intermittently for display.

It should be noted that the above description regarding the process 400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added in the process 400 and/or one or more operations of the process 400 described above may be omitted. For example, 410 may be omitted. As another example, an additional operation may be added between operations 420 and 430 for establishing an operable connection between the first intercom 110 and a target second image acquisition device.

Figure 5:
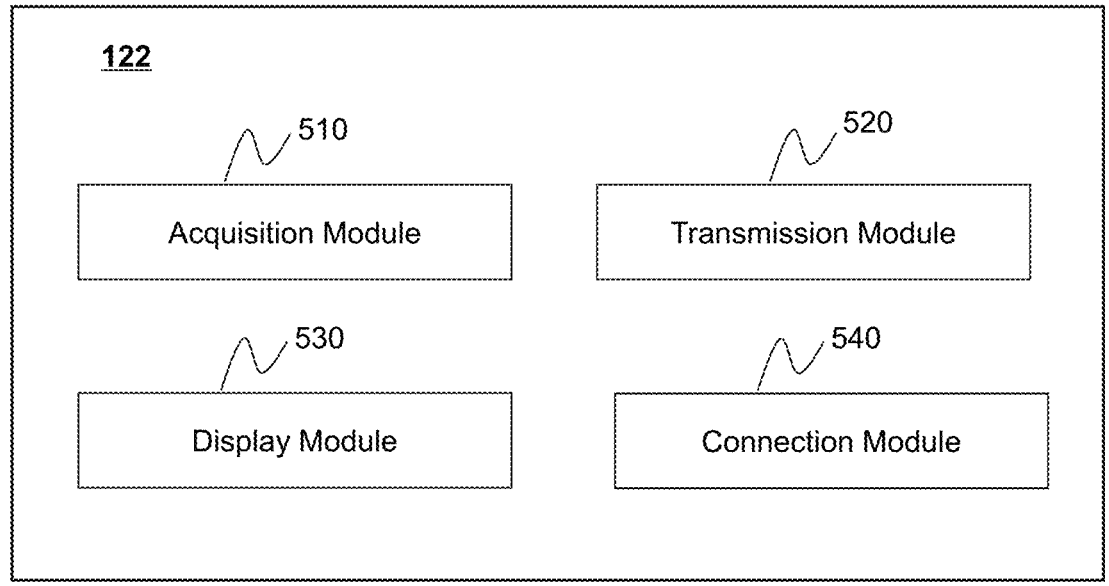
FIG. 5 is a schematic diagram illustrating an exemplary processing device of a second intercom according to some embodiments of the present disclosure.

FIG. 5 is a schematic diagram illustrating an exemplary processing device 122 of a second intercom according to some embodiments of the present disclosure. As shown in FIG. 5, the processing device 122 may include an acquisition module 510, a transmission module 520, a display module 530, and a connection module 540.

The acquisition module 510 may be configured to obtain and/or receive information, requests, and/or instructions from one or more other components of the intercom system 100. For example, the acquisition module 510 may receive a connection request from a first intercom 110. As another example, during an intercom between the first intercom 110 and the second intercom, the acquisition module 510 may receive a signal encoding target image data captured by one or more target image acquisition devices from the first intercom 110. More descriptions regarding the signal encoding the target image data may be found elsewhere in the present disclosure. See, e.g., operation 730 in FIG. 7 and relevant descriptions thereof.

The transmission module 520 may be configured to transmit information, instructions, and/or requests to one or more other components of the intercom system 100. For example, the transmission module 520 may send a connection request to a first intercom 110. As another example, the transmission module 520 may send an approval regarding a connection request to the first intercom 110. As still another example, the transmission module 520 may send a request for target image data captured by one or more target image acquisition devices to the first intercom 110.

Figure 6:
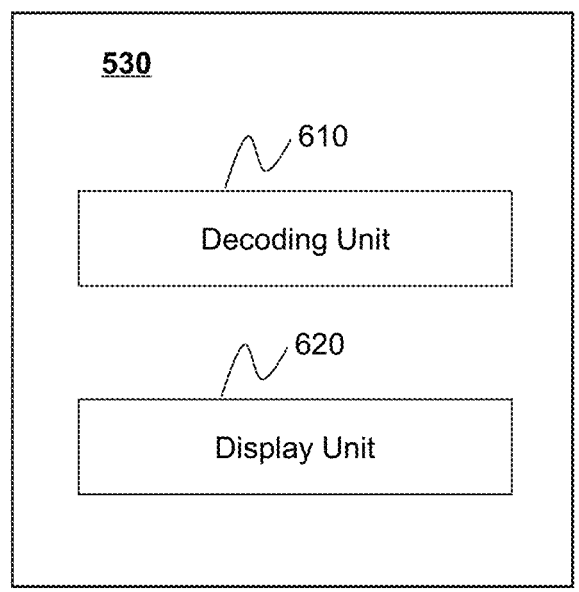
FIG. 6 is a schematic diagram illustrating a display module according to some embodiments of the present disclosure.

The display module 530 may be configured to display data via, for example, a display of the second intercom. For example, the display module 530 may direct the display of the second intercom to jointly display target image data captured by a plurality of target image acquisition devices of the intercom system 100. More descriptions regarding the display of the target image data may be found elsewhere in the present disclosure (e.g., operations 450 and 740 and the descriptions thereof). In some embodiments, the display module 530 may include a decoding unit 610 and a display unit 620 as shown in FIG. 6. The decoding unit 610 may be configured to decode a signal encoding target image data that is captured by one or more target image acquisition devices to obtain the target image data. The display unit 620 may be configured to display the target image data via, for example, a screen of the second intercom.

It should be noted that the above descriptions of the processing device 122 and the display module 530 are merely provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. In some embodiments, two or more of the modules (units) may be combined into a single module (unit), and any one of the modules may be divided into two or more units. For example, the transmission module 520 and the connection module 540 may be integrated into a single module. As another example, the transmission module 520 may include a first unit to send a connection request to a first intercom 110 and a second unit to send a request for target image data to the first intercom 110. In some embodiments, one or more of the modules mentioned above may be omitted and/or one or more additional modules may be added in the processing device 122. For example, the processing device 122 may further include a storage module.

Figure 7:
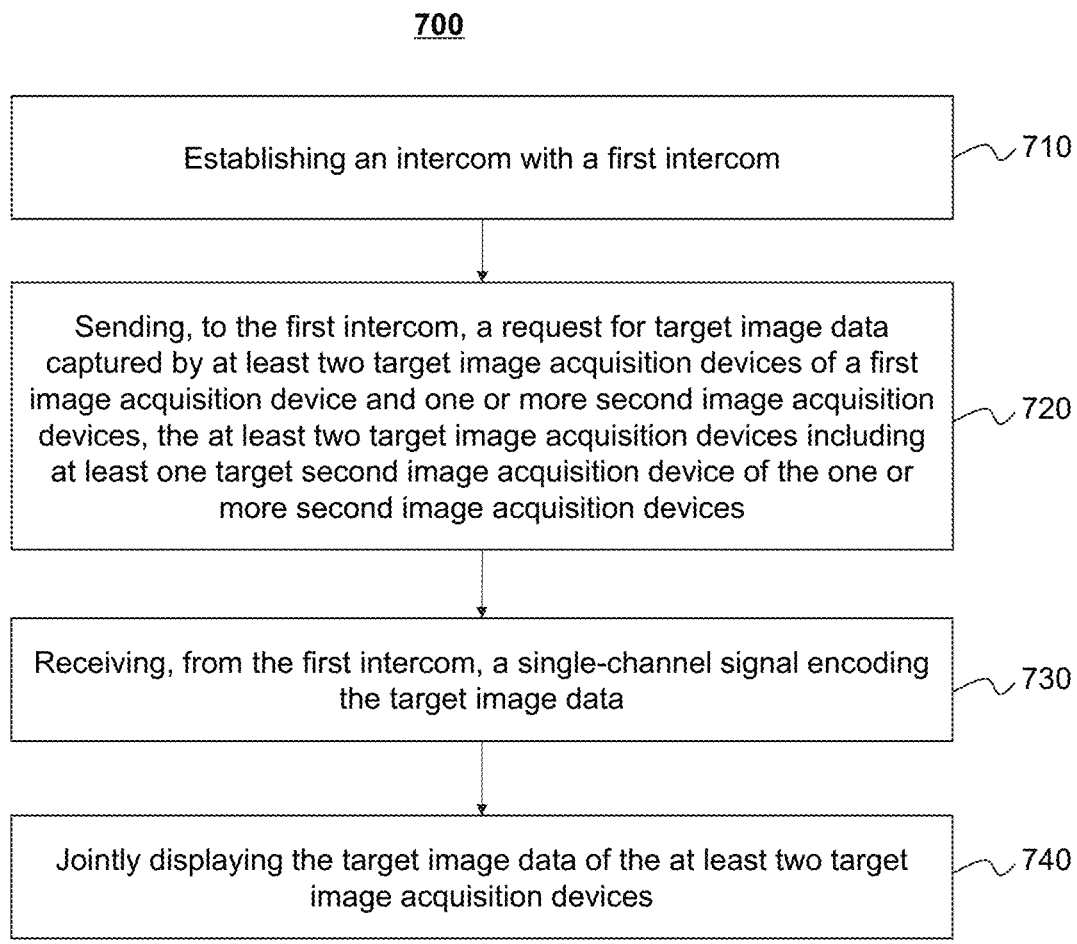
FIG. 7 is a flowchart of an exemplary process for data transmission in an intercom system according to some embodiments of the present disclosure.

FIG. 7 is a flowchart of an exemplary process 700 for data transmission in an intercom system according to some embodiments of the present disclosure. In some embodiments, one or more operations in the process 700 may be implemented in the intercom system 100 illustrated in FIG. 1. For example, one or more operations in the process 700 may be stored in a storage device (e.g., a storage device of a second intercom 120) as a form of instructions, and invoked and/or executed by a processing device 122 (e.g., one or more modules illustrated FIGS. 5 and 6) of the second intercom 120. The second intercom 120 may be operably connected to the first intercom 110 as described in FIG. 5.

In 710, the second intercom 120 (e.g., the processing device 122, the connection module 540) may establish an intercom with the first intercom 110. More descriptions regarding the establishment of the intercom between the first intercom 110 and the second intercom 120 may be found elsewhere in the present disclosure. See, e.g., operation 410 in FIG. 4. and relevant descriptions thereof.

In 720, the second intercom 120 (e.g., the processing device 122, the transmission module 520) may send a request for target image data captured by at least two target image acquisition devices to the first intercom 110.

In some embodiments, the at least two target image acquisition devices may include at least one target second image acquisition device of the second image acquisition device(s) 130. For example, the at least two target image acquisition devices may include the first image acquisition device 111 and one or more second image acquisition devices 130. As another example, the at least two target image acquisition devices may include at least two second image acquisition devices 130. More descriptions regarding the request, the target image data, and the target image acquisition device(s) may be found elsewhere in the present disclosure. See, operation 420 in FIG. 4 and relevant descriptions thereof.

In 730, the second intercom 120 (e.g., the processing device 122, the acquisition module 510) may receive a single-channel signal encoding the target image data from the first intercom 110. More descriptions regarding the single-channel signal may be found elsewhere in the present disclosure. See, e.g., operations 440 and 450 in FIG. 4 and relevant descriptions thereof.

In 740, the second intercom 120 (e.g., the processing device 122, the display module 530) may jointly display the target image data of the at least two target image acquisition devices.

In some embodiments, the second intercom 120 may decode the single-channel signal to obtain the target image data of the at least two target image acquisition devices. The second intercom 120 may spilt its screen of the second intercom into a plurality of regions to jointly display the target image data. More descriptions regarding the display of the target image data may be found elsewhere in the present disclosure. See, e.g., operations 450 in FIG. 4. and operation and relevant descriptions thereof.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the second intercom 120 may send a request for target data captured by one target image acquisition device to the first intercom 110. For example, the second intercom 120 may send a request for target image captured by a certain second image acquisition device 130 to the first intercom 110. In some embodiments, one or more additional operations may be added in the process 700 and/or one or more operations of the process 700 described above may be omitted. For example, 710 may be omitted. As another example, an additional operation may be added between operations 720 and 730 for establishing an operable connection between the first intercom 110 and a target second image acquisition device.

Figure 8:
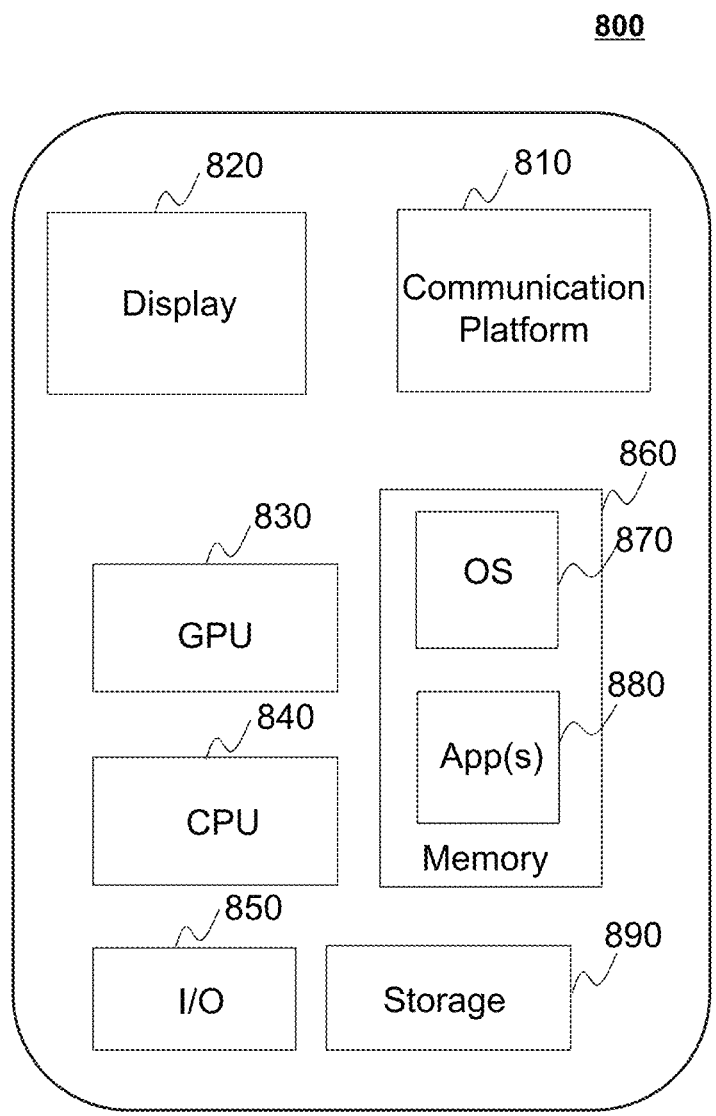
FIG. 8 is a schematic diagram illustrating exemplary hardware and/or software components of a terminal device according to some embodiments of the present disclosure.

FIG. 8 is a schematic diagram illustrating exemplary hardware and/or software components of a terminal device 800 according to some embodiments of the present disclosure. In some embodiments, one or more components (e.g., the first intercom 110, and/or the second intercom 120) of the intercom system 100 may be implemented on the terminal device 800.

As illustrated in FIG. 8, the terminal device 800 may include a communication port 810, a display 820, a graphics processing unit (GPU) 830, a central processing unit (CPU) 840, an I/O 850, a memory 860, and a storage 890. In some embodiments, any other suitable component, including but not limited to a system bus, a controller or a camera (not shown), may also be included in the terminal device 800. In some embodiments, a mobile operating system 870 (e.g., iOS™, Android™, Windows Phone™, etc.) and one or more applications 880 may be loaded into the memory 860 from the storage 890 in order to be executed by the CPU 840. The applications 880 may include a browser or any other suitable mobile apps for receiving and rendering information relating to the image acquisition system 100. User interactions with the information stream may be achieved via the I/O 850 and provided to the image acquisition system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. An intercom of an intercom system, the intercom system comprising:
    the intercom including a first image acquisition device that has a first field of view (FOV);
    one or more second image acquisition devices, each second image acquisition device being operably connected to the intercom and having a second FOV different from the first FOV;
    a second intercom operably connected to the intercom, wherein, during an intercom with the second intercom, the intercom is configured to:
        receive, from the second intercom, a request for target image data captured by one or more target image acquisition devices of the first image acquisition device and the one or more second image acquisition devices, the one or more target image acquisition devices including at least one target second image acquisition device of the one or more second image acquisition devices;
        in response to the request,
            decode the request to obtain an identification for each target image acquisition device;
            identify each target image acquisition device based on its corresponding identification;
            obtain the tartlet image data from each identified tartlet image acquisition device; and
            send a signal encoding the target image data to the second intercom for display.

2. The intercom of claim 1, wherein the signal is a single-channel signal.

3. The intercom of claim 1, wherein to receive a request for target image data captured by one or more target image acquisition devices, the intercom is further configured to:
    transmit a signal encoding image data captured by one or more initial image acquisition devices of the first image acquisition device and the one or more second image acquisition devices to the second intercom for display; and
    receive, from the second intercom, the request for the target image data captured by the one or more target image acquisition devices, wherein at least one of the one or more target image acquisition devices is different from each initial image acquisition device.

4. The intercom of claim 1, wherein the at least one target second image acquisition device includes a plurality of target second image acquisition devices, and to send a signal encoding the target image data to the second intercom, the intercom is configured to:
    decode the target image data obtained from the one or more target second image acquisition devices; and
    generate the signal by recoding the decoded target image data.

5. The intercom of claim 1, wherein the one or more target image acquisition devices include a plurality of target image acquisition devices, and the second intercom is configured to:
    decode the received signal to obtain the target image data of each target image acquisition device; and
    jointly display the target image data of each target image acquisition device.

6. The intercom of claim 1, wherein the one or more second image acquisition devices include a plurality of second image acquisition devices, and to obtain the target image data from the one or more target second image acquisition devices, the intercom is configured to:
    obtain image data from each of the plurality of second image acquisition devices; and
    determine, from the image data, the target image data captured by the one or more target second image acquisition devices.

7. The intercom of claim 1, wherein the request is encoded by a Dual Tone Multi-Frequency (DTMF) signal.

8. The intercom of claim 1, wherein the intercom with the second intercom includes at least one of an audio intercom or a video intercom.

9. The intercom of claim 1, wherein before the intercom with the second intercom, the intercom is configured to:
    send a connection request to the second intercom;
    upon receiving an approval regarding the connection request from the second intercom, establish a connection to the second intercom.

10. The intercom of claim 1, wherein before the intercom with the second intercom, the intercom is configured to:
    receive, from the second intercom, a connection request; and
    send, to the second intercom, an approval regarding the connection request.

11. The intercom of claim 1, wherein before the intercom with the second intercom, the intercom is configured to:
    receive authentication information of each of the one or more second image acquisition devices; and
    establish, based on the authentication information, an operable connection to each of the one or more second image acquisition device.

12. An intercom of an intercom system, the intercom system comprising:

a first intercom including a first image acquisition device that has a first field of view (FOV);

one or more second image acquisition devices operably connected to the first intercom and having a second FOV different from the first FOV;

the intercom being operably connected to the first intercom, wherein, during an intercom with the first intercom, the intercom is configured to:

send, to the first intercom, a request for target image data captured by at least two target image acquisition devices of the first image acquisition device and the one or more second image acquisition devices, the at least two target image acquisition devices including at least one target second image acquisition device of the one or more second image acquisition devices;

receive, from the first intercom, a single-channel signal encoding the target image data; and jointly display the target image data of the at least two target image acquisition devices.

13. The intercom of claim 12, wherein to send a request for target image data captured by at least two target image acquisition devices, the intercom is further configured to:

receive, from the first intercom, a signal encoding image data captured by one or more initial image acquisition devices of the first image acquisition device and the one or more second image acquisition devices; and transmit, to the first intercom, the request for the target image data captured by the at least two target image acquisition devices, wherein at least one of the at least two target image acquisition devices is different from each initial image acquisition device.

14. The intercom of claim 12, wherein to jointly display the target image data of the at least two target image acquisition devices, the intercom is configured to:

decode the received single-channel signal to obtain the target image data of the at least two target image acquisition devices; and jointly display the target image data of the at least two target image acquisition devices.

15. The intercom of claim 12, wherein the request is encoded by a Dual Tone Multi Frequency (DTMF) signal.

16. The intercom of claim 12, wherein the intercom with the first intercom includes at least one of an audio intercom or a video intercom.

17. The intercom of claim 12, wherein before the intercom with the first intercom, the intercom is configured to:

send a connection request to the first intercom;

upon receiving an approval regarding the connection request from the first intercom, establish a connection to the first intercom.

18. The intercom of claim 12, wherein before the intercom with the first intercom, the intercom is configured to:

receive, from the first intercom, a connection request; and send, to the first intercom, an approval regarding the connection request.

19. A method implemented by a first intercom of an intercom system, the intercom system comprising:

the first intercom including a first image acquisition device that has a first field of view (FOV);

one or more second image acquisition devices, each second image acquisition device being operably connected to the first intercom and having a second FOV different from the first FOV; and a second intercom operably connected to the first intercom, wherein during an intercom between the first intercom and the second intercom, the method comprising:

receiving, from the second intercom, a request for target image data captured by one or more target image acquisition devices of a first image acquisition device and one or more second image acquisition devices, the one or more target image acquisition devices including at least one target second image acquisition device of the one or more second image acquisition devices;

in response to the request, decoding the request to obtain an identification for each target image acquisition device;

identifying each target image acquisition device based on its corresponding identification;

obtaining the target image data from each identified target image acquisition device; and sending a signal encoding the target image data to the second intercom for display.

* * * * *